United States Patent
Chiu et al.

(10) Patent No.: US 8,468,133 B2
(45) Date of Patent: *Jun. 18, 2013

(54) WORKLOAD LEARNING IN DATA REPLICATION ENVIRONMENTS

(75) Inventors: Lawrence Yiumchee Chiu, Saratoga, CA (US); Yang Liu, Shanghai (CN); Matthew Joseph Kalos, Tucson, AZ (US); Paul Henri Muench, San Jose, CA (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,714

(22) Filed: Apr. 27, 2012

(65) Prior Publication Data

US 2012/0221499 A1 Aug. 30, 2012

Related U.S. Application Data

(63) Continuation of application No. 13/037,285, filed on Feb. 28, 2011.

(51) Int. Cl.
*G06F 17/00* (2006.01)
(52) U.S. Cl.
USPC ........... 707/637; 707/677; 707/686; 707/616; 707/635

(58) Field of Classification Search
USPC .................. 707/677, 616, 686, 635, 637, 638
See application file for complete search history.

(56) References Cited

U.S. PATENT DOCUMENTS

| | | | |
|---|---|---|---|
| 7,246,140 B2 * | 7/2007 | Therrien et al. | 1/1 |
| 7,266,656 B2 | 9/2007 | Chen et al. | |
| 7,296,008 B2 * | 11/2007 | Passerini et al. | 1/1 |
| 7,904,428 B2 * | 3/2011 | Perry et al. | 707/677 |
| 8,055,745 B2 | 11/2011 | Atluri | |
| 8,285,681 B2 * | 10/2012 | Prahlad et al. | 707/640 |
| 2012/0042202 A1 * | 2/2012 | Wenzel | 714/6.3 |

* cited by examiner

*Primary Examiner* — Sana Al Hashemi
(74) *Attorney, Agent, or Firm* — Nelson and Nelson; Daniel P. Nelson; Alexis V. Nelson

(57) ABSTRACT

A method for replicating I/O performance in data replication environments, such as PPRC environments, is described. In selected embodiments, such a method includes monitoring I/O workload at a primary storage device over a period of time, such as a period of hours, days, or months. The method then generates learning data at the primary storage device describing the I/O workload over the selected time period. The learning data is replicated from the primary storage device to a secondary storage device. The method uses the learning data to optimize the secondary storage device to handle the I/O workload of the primary storage device. This will enable the secondary storage device to provide substantially the same I/O performance as the primary storage device in the event a failover occurs.

8 Claims, 8 Drawing Sheets

WORKLOAD LEARNING IN DATA REPLICATION ENVIRONMENTS

BACKGROUND

1. Field of the Invention

This invention relates to systems and methods for duplicating I/O performance in data replication environments, such as Peer-to-Peer-Remote-Copy ("PPRC") environments.

2. Background of the Invention

In data replication environments such as Peer-to-Peer-Remote-Copy ("PPRC") environments, data is mirrored from a primary storage device to a secondary storage device to maintain two consistent copies of the data. The primary and secondary storage devices may be located at different sites, perhaps hundreds or even thousands of miles away from one another. In the event the primary storage device fails, I/O may be redirected to the secondary storage device, thereby enabling continuous operations. When the primary storage device is repaired, I/O may resume to the primary storage device. The process of redirecting I/O from the primary storage device to the secondary storage device when a failure or other event occurs may be referred to as a "failover."

In many cases, a user may require that the secondary storage device perform in an exact or similar manner to the primary storage device in the event of a failure. This is not always possible, since the secondary storage device may not see all of the I/O that is received by the primary storage device during normal operations and thus may not be optimized for such. For example, the secondary storage device may see writes to the primary storage device, since writes are mirrored to the secondary storage device, but may not see reads, since there is generally no need to mirror reads. As a result, the secondary storage device may be optimized for a subset of the I/O, or significantly different or reduced I/O, compared to that received by the primary storage device. Thus, when a failover occurs, the secondary storage device may not be optimized to provide the same level of I/O performance the primary storage device provided prior to the failover, at least until the secondary storage device is reconfigured for the new I/O workload. Allowing the secondary storage device to adapt to the new I/O workload can take a significant amount of time, perhaps hours, days, or even months, which is unacceptable for many users.

In view of the foregoing, what are needed are systems and methods to duplicate I/O performance in data replication systems, such as PPRC systems. Ideally, such systems and methods would enable a secondary storage device to be optimized to handle the I/O workload of a primary storage device when an event such as a failover occurs.

SUMMARY

The invention has been developed in response to the present state of the art and, in particular, in response to the problems and needs in the art that have not yet been fully solved by currently available systems and methods. Accordingly, the invention has been developed to provide systems and methods for replicating I/O performance in data replication environments. The features and advantages of the invention will become more fully apparent from the following description and appended claims, or may be learned by practice of the invention as set forth hereinafter.

Consistent with the foregoing, a method for replicating I/O performance in data replication environments, such as PPRC environments, is disclosed herein. In selected embodiments, such a method includes monitoring I/O workload at a primary storage device over a period of time, such as a period of hours, days, or months. The method then generates learning data at the primary storage device describing the I/O workload over the selected time period. This learning data is replicated from the primary storage device to a secondary storage device. The method uses the learning data to optimize the secondary storage device to handle the I/O workload of the primary storage device. This will enable the secondary storage device to provide substantially the same I/O performance as the primary storage device if an event such as a failover occurs.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
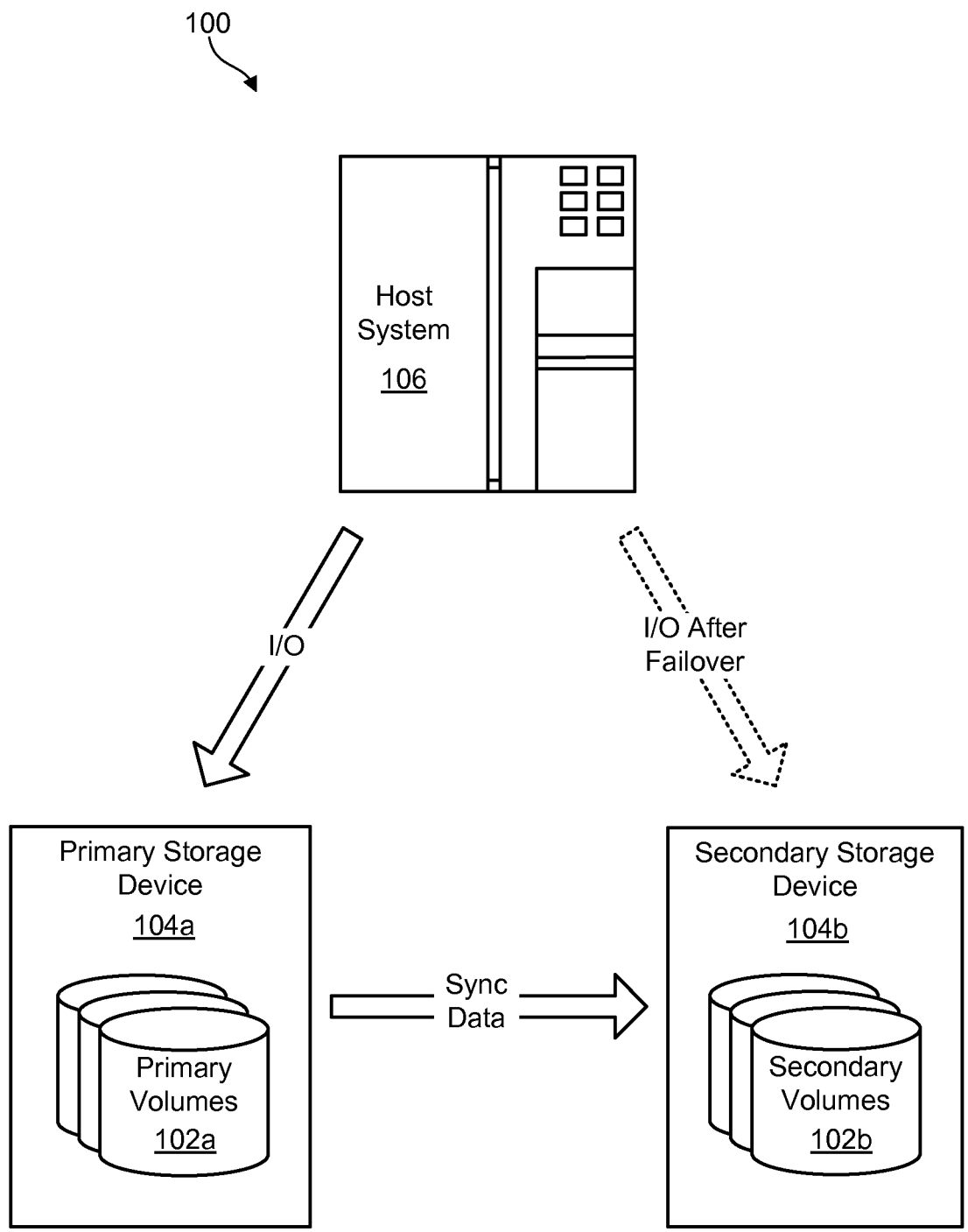
FIG. 1 is a high-level block diagram showing one example of a data replication system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer-program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Referring to FIG. 1, one example of a data replication system 100, in this embodiment a PPRC system 100, is illustrated. The PPRC system 100 is presented to show an example of an architecture in which embodiments of the invention might operate, and is not intended to be limiting. In general, the PPRC system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage device 104, although the volumes 102a, 102b are typically located on separate storage devices 104a, 104b located some distance (e.g., several miles to thousands of miles) from one another. Channel extension equipment may be located between the storage devices 104a, 104b, as needed, to extend the distance over which the storage devices 104a, 104b may communicate.

The PPRC system 100 may, in certain embodiments, be configured to operate in either a synchronous or asynchronous manner. When operating synchronously, an I/O may only be considered complete when it has completed successfully on both the primary and secondary storage devices 104a, 104b. As an example, in such a configuration, a host system 106 may initially send a write request to the primary storage device 104a. This write operation may be performed on the primary storage device 104a. The primary storage device 104a may, in turn, transmit a write request to the secondary storage device 104b. The secondary storage device 104b may execute the write operation and return a write acknowledge signal to the primary storage device 104a. Once the write has been performed on both the primary and secondary storage devices 104a, 104b, the primary storage device 104a returns a write acknowledge signal to the host system 106. The I/O is considered complete when the host 106 receives the write acknowledge signal.

By contrast, asynchronous operation may only require that the write complete on the primary storage device 104a before the write is considered complete. That is, a write acknowledgement may be returned to the host system 106 when the write has completed on the primary storage device 104a, without requiring that the write be completed on the secondary storage device 104b. The write may then be mirrored to the secondary storage device 104b as time and resources allow to create a consistent copy on the secondary storage device 104b.

In the event the primary storage device 104a fails, I/O may be redirected to the secondary storage device 104b, thereby enabling continuous operations. This process may be referred to as a "failover." Since the secondary storage device 104b contains a consistent copy of the data on the primary storage device 104a, the redirected I/O (e.g., reads and writes) may be performed on the copy of the data on the secondary storage device 104b. When the primary storage device 104a is repaired or resumes operation, the I/O may be redirected to the primary storage device 104a. This process may be referred to as a "failback."

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

Figure 2:
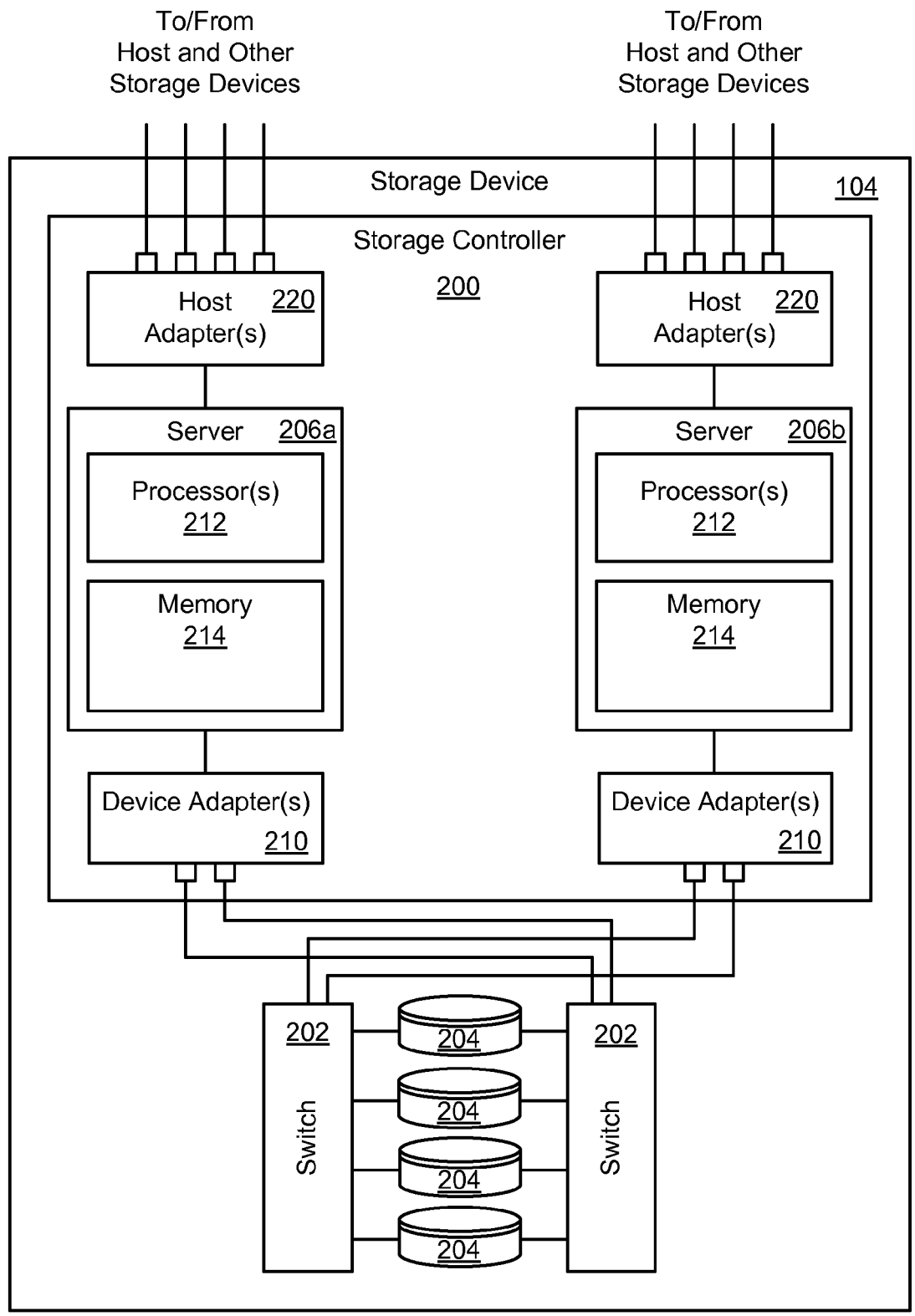
FIG. 2 is a high-level block diagram showing one example of a storage device in a data replication system.

Referring to FIG. 2, one embodiment of a storage device 104 (such as the primary or secondary storage device 104a, 104b) for use with embodiments of the invention is illustrated. This storage device 104 is provided only by way of example and is not intended to be limiting. In this example, the storage device 104 contains an array of hard-disk drives 204 and/or solid-state drives 204. As shown, the storage device 104 includes a storage controller 200, one or more switches 202, and storage media 204 such as hard-disk drives 204 or solid-state drives 204. The storage controller 200 enables one or more hosts 106 (e.g., open system and/or mainframe servers 106) or storage devices 104 to access data in the storage media 204.

In selected embodiments, the storage controller 200 includes one or more servers 206. The storage controller 200 may also include host adapters 220 to connect to host devices 106 and other storage devices 104. The storage controller 200 may also include device adapters 210 to connect to the storage media 204. Multiple servers 206a, 206b may provide redundancy to ensure that data is always available to connected hosts. Thus, when one server 206a fails, the other server 206b may pick up the I/O load of the failed server 206a to ensure that I/O is able to continue between the hosts 106 and the storage devices 204. This process within the storage device 104 may be referred to as a "failover." One example of a storage device 104 having an architecture similar to that illustrated in FIG. 2 is the IBM DS8000™ enterprise storage system.

Nevertheless, embodiments of the invention are not limited to being implemented with an IBM DS8000™ enterprise storage system, but may be implemented in any comparable or analogous storage device 104, regardless of the manufacturer, product name, or components or component names associated with the system. Any storage device 104 that could benefit from or be used to implement one or more embodiments of the invention is deemed to fall within the scope of the invention. Thus, the IBM DS8000™ is presented only by way of example.

In selected embodiments, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The memory 214 may store software modules that run on the processor(s) 212 and are used to access data in the storage media 204. The servers 206 may host at least one instance of these software modules, which collectively may also be referred to as a "server," albeit in software form. These software modules may manage all read and write requests to logical volumes 102 in the storage media 204.

Figure 3:
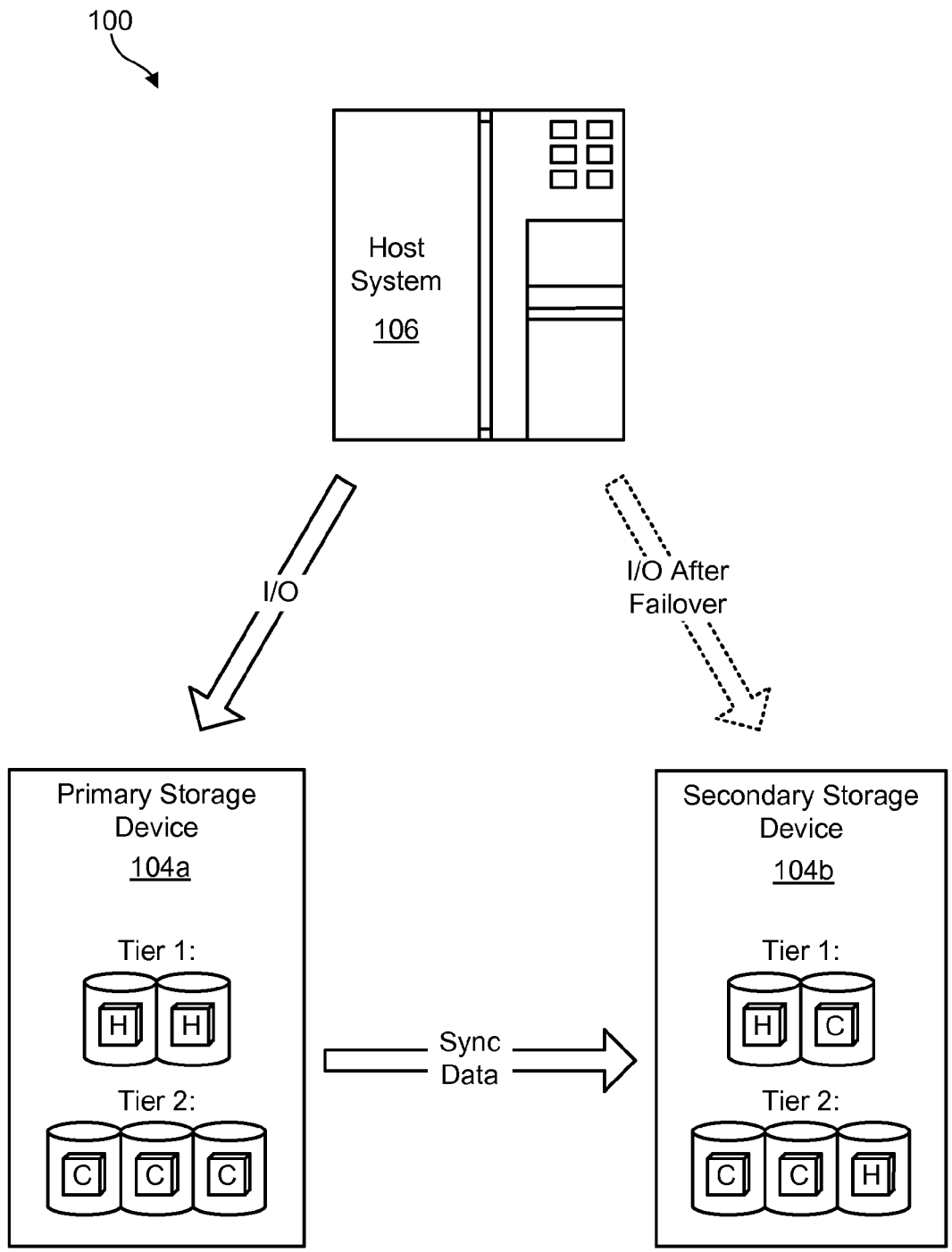
FIG. 3 is a high-level block diagram showing one example of storage device data allocation in a data replication system.

Referring now to FIG. 3, as previously mentioned, in many cases, a user may require that a secondary storage device 104b perform in an exact or similar manner to a primary storage device 104a in the event of a failover. This may be difficult to achieve, since the secondary storage device 104b may not see all of the I/O that is received by the primary storage device 104a during normal operations. For example, the secondary storage device 104b may see writes to the primary storage devices 104a, since these may be mirrored to the secondary storage device 104b, but may not see reads, since there is generally no need to mirror reads. As a result, the secondary storage device 104b may not be optimized or configured for the same I/O workload as the primary storage device 104a.

For example, referring to FIG. 3, as reads and writes are received by the primary storage device 104a, the primary storage device 104a may move data to different tiers of storage based on how "hot" or "cold" the data is. For the purposes of this disclosure, "hot" data is considered to be data that is accessed frequently or recently, while "cold" data is data that is accessed infrequently or less recently. To improve I/O performance, the primary storage device 104a may be configured to move hot data to faster storage media (cache, solid state drives, etc.), while colder data may be moved to slower storage media (hard disk drives, tape, etc.). In other cases, a user such as a system administrator may designate on what tiers data is stored. In the illustrated example, "Tier 1" is assumed to contain faster storage media while "Tier 2" contains slower storage media. As shown, hotter data (labeled "H") is stored on faster storage media while colder data (labeled "C") is stored on slower storage media.

Nevertheless, because the secondary storage device 104b may not see all of the I/O that is occurring on the primary storage device 104a, or be aware that a user has allocated data in a particular manner, the secondary storage device 104b may not allocate and organize the data in the same manner. This may be true even if the secondary storage device 104b has exactly or substantially the same hardware setup as the primary storage device 104a. For example, because it has limited information, the secondary storage device 104b may not make the same determination as to the hotness or coldness of data. For example, if the secondary storage device 104b is unaware that certain data is frequently read, the secondary storage device 104b may not designate the data as "hot" and move it to faster storage devices. As shown in FIG. 3, because the secondary storage device 104b may not be aware of all I/O occurring on the primary storage device 104a, the secondary storage device 104b organizes the hot and cold data differently on the tiered storage media. The secondary storage device 104b may also configure its hardware and/or software differently to correspond to the I/O workload that it receives.

Because the secondary storage device 104b may be configured differently than the primary storage device 104a, both in terms of hardware/software configuration and data placement, the secondary storage device 104b may be unable to provide the same I/O performance as the primary storage device 104 when a failover occurs. Although the secondary storage device 104b could theoretically reconfigure itself over time as it evaluates the new I/O workload, this could take a significant amount of time—perhaps hours, days, or even months. Thus, systems and methods are needed to enable the secondary storage device 104b to be optimized to replicate, as much as possible, the I/O performance of the primary storage device 104a.

Figure 4:
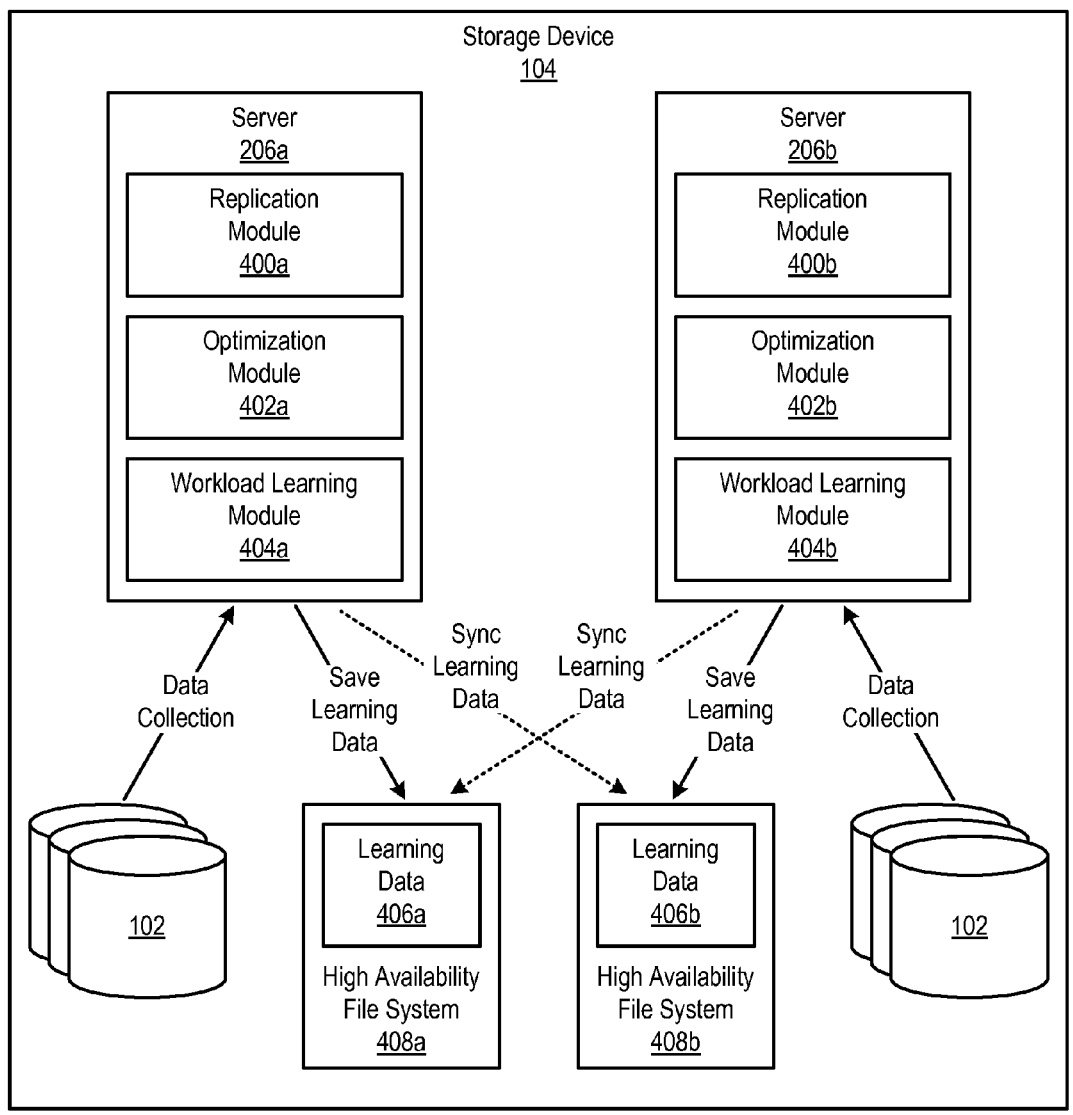
FIG. 4 is a high-level block diagram showing the generation of persistent learning data in a storage device containing dual servers.

Referring to FIG. 4, in certain embodiments, a storage device 104 like that illustrated in FIG. 2, may include various modules to optimize data placement and configuration settings for a particular I/O workload. These modules may be implemented in hardware, software or firmware executable on hardware, or a combination thereof. These modules are presented only by way of example and are not intended to be limiting. Indeed, alternative embodiments may include more or fewer modules than those illustrated.

In the illustrated embodiment, the storage device 104 includes multiple servers 206a, 206b, each hosting the same modules, although this is not necessary in all embodiments. Each server 206a, 206b may handle the I/O workload for different volumes 102 in the storage device 104. For example, one server 206a could handle I/O to volumes assigned to odd logical subsystems, while the other server 206b could handle I/O to volumes assigned to even logical subsystems. When one server 206a fails, the other server 206b picks up the I/O workload of the failed server 206a.

As shown, in selected embodiments, each of the servers 206 includes one or more of a replication module 400, an optimization module 402, and a workload learning module 404. When a server 206a receives I/O (reads and/or writes) from a host system 106, the server 206a executes the I/O on the volumes 102 that it manages. Assuming the storage device 104 is a primary storage device 104a, the replication module 400a in the server 206a mirrors writes to the secondary storage device 104b to generate a consistent copy of the data thereon.

As a server 206a receives and processes I/O, a workload learning module 404a maintains a history of the I/O workload. The I/O workload history may include, among other information, the amount of I/O that is received, the timing of the I/O that is received, the data or volumes the I/O was intended for, the hotness or coldness of data, the location of data in the storage tiers, or the like. In selected embodiments, the workload learning module 404a records the I/O workload history over a period of time, such as a period of hours, days, or months, to accurately characterize the I/O. The workload learning module 404a may save the I/O workload history in the form of persistent learning data 406a. In certain embodiments, this persistent learning data 406a is recorded in a high availability file system 408a, such as a file system on a pair of redundant hard disks. In the event the server 206a needs to restart, the server 206a can reload the persistent learning data 406a from the high availability file system 408a to optimize the system.

In certain embodiments, such as when one server 206a fails, the learning data 406a associated with the failed server 206a is merged with the learning data 406b of the other server 206b. This will ensure that the other server 206b can pick up the I/O workload of the failed server 206a. The other server 206b can also use the learning data 406a of the failed server 206a to configure itself to handle the failed server's I/O in an optimal manner, such as by allocating data on optimal storage tiers. Upon handling the I/O of the failed server 206a, the server 206b may update the merged learning data as the I/O characteristics or data placement changes. When the failed server 206a resumes operation, the server 206a can reload the learning data 406b from the opposite server 206b.

In certain embodiments, each of the servers 206 may also include an optimization module 402. Using the learning data, the optimization module 402 may configure the server 206 and associated volumes 102 to handle the I/O workload in an optimal manner. For example, the optimization module 402 may move hotter data to higher tiers and colder data to lower tiers of the storage device 104. The optimization module 402 may also configure hardware and/or software of the storage device 104 to optimally handle the I/O workload.

Figure 5:
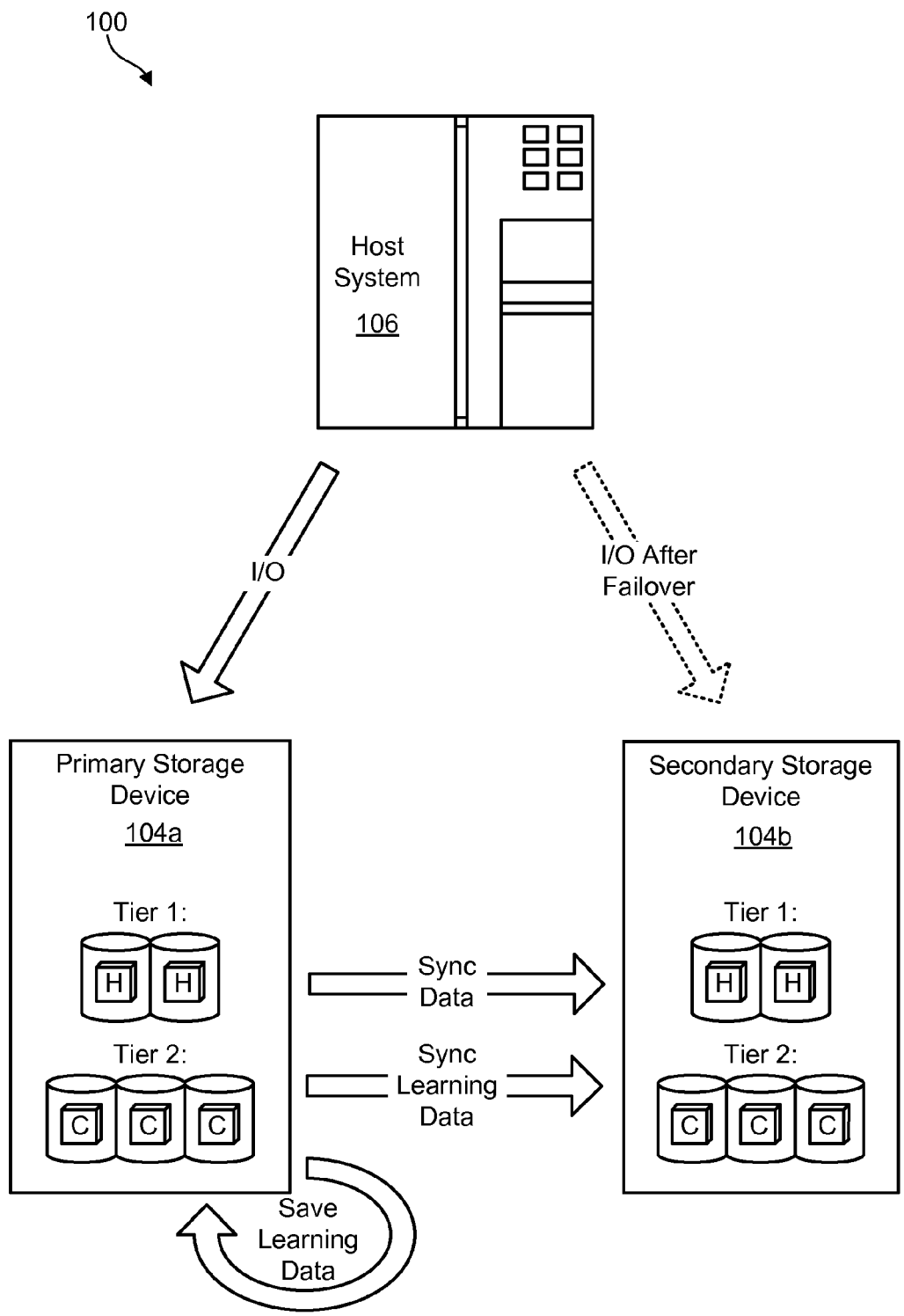
FIG. 5 is a high-level block diagram showing the replication of learning data to a secondary storage device, where the learning data is used to optimize data placement on the secondary storage device in substantially the same way as the primary storage device.

Referring to FIG. 5, in selected embodiments in accordance with the invention, the learning data 406 generated at the primary storage device 104a, in addition to being saved at the primary storage device 104a, may be mirrored to the secondary storage device 104b. Using this learning data 406, the secondary storage device 104b may allocate data and configure hardware and/or software in substantially the same way as the primary storage device 104a. This will enable the secondary storage device 104b to substantially duplicate the I/O performance of the primary storage device 104a in the event of a failover or other event where the I/O workload of the primary storage device 104a is transferred to the secondary storage device 104b. FIG. 5 shows an embodiment where the secondary storage device 104b includes substantially the same hardware setup as the primary storage device 104a. Using the learning data 406 from the primary storage device 104a, the secondary storage device 104b reorganizes its data on the tiered storage to substantially match that of the primary storage device 104a. The secondary storage device 104b may also use the learning data 406 to configure its hardware and/or software in substantially the same way as the primary storage device 104a.

In certain embodiments, the secondary storage device 104b is configured to use the learning data 406 from the primary storage device 104a to reconfigure itself immediately or shortly after it is received. In other embodiments, the secondary storage device 104b is configured to periodically reconfigure itself with the learning data 406 from the primary storage device 104a. In yet other embodiments, the secondary storage device 104b is configured to wait for a failover or other event before it reconfigures itself with the learning data 406 from the primary storage device 104a. Once reconfigured, the secondary storage device 104b may provide substantially the same I/O performance as the primary storage device 104a under the same I/O workload.

As previously mentioned, in certain embodiments, the learning data 406 contains the I/O workload history of the primary storage device 104a. The secondary storage device 104b may use this I/O workload history to determine how to optimally place data on different storage tiers of the secondary storage device 104b. The secondary storage device 104b may also use this data to determine how to optimize its hardware and/or software to service the I/O workload. In other embodiments, the learning data 406 also, or alternatively, contains commands to optimize the secondary storage device 104b. For example, these commands could be executed on the secondary storage device 104b to move data to optimal storage tiers or to optimize hardware or software of the secondary storage device 104b. Thus, the secondary storage device 104b can either optimize itself by analyzing the I/O workload history described in the learning data 406, or optimize itself by executing commands contained in the learning data 406.

Once the secondary storage device 104b has optimized itself in accordance with the learning data 406 received from the primary storage device 104a, the secondary storage device 104b may update the learning data 406 over time as the I/O workload changes. When the primary storage device 104a resumes operation and a failback occurs (causing I/O to resume to the primary storage device 104a), the updated learning data 406 may be synchronized back to the primary storage device 104a for use thereon.

Figure 6:
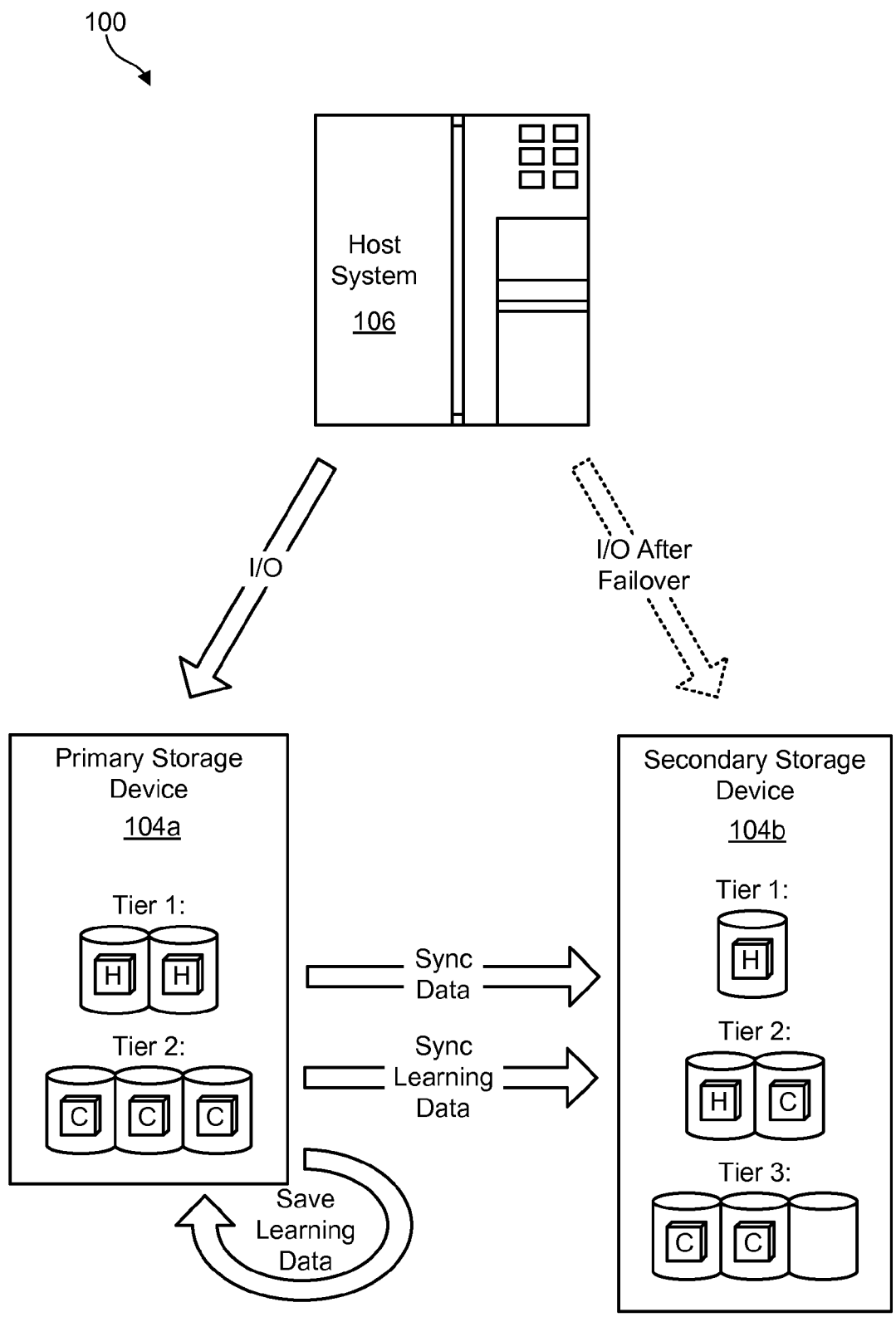
FIG. 6 is a high-level block diagram showing the replication of learning data to a secondary storage device having a different hardware setup than the primary storage device, where the learning data is used to optimize data placement on the secondary storage device to replicate the I/O performance of the primary storage device as much as possible.

Referring to FIG. 6, in selected embodiments, the secondary storage device 104b may have different hardware and/or software than the primary storage device 104a. For example, the secondary storage device 104b may have different storage tiers or different amounts of storage media in the different storage tiers. In such embodiments, it may be impossible to configure the secondary storage device 104b or allocate data in exactly the same way as the primary storage device 104a. In such embodiments, the secondary storage device 104b may receive the learning data 406 from the primary storage device 104a and optimize itself as much as possible to duplicate the I/O performance of the primary storage device 104a. As shown in FIG. 6, the secondary storage device 104b organizes data on its storage tiers to achieve I/O performance that, as much as possible, matches the I/O performance of the primary storage device 104a.

Figure 7:
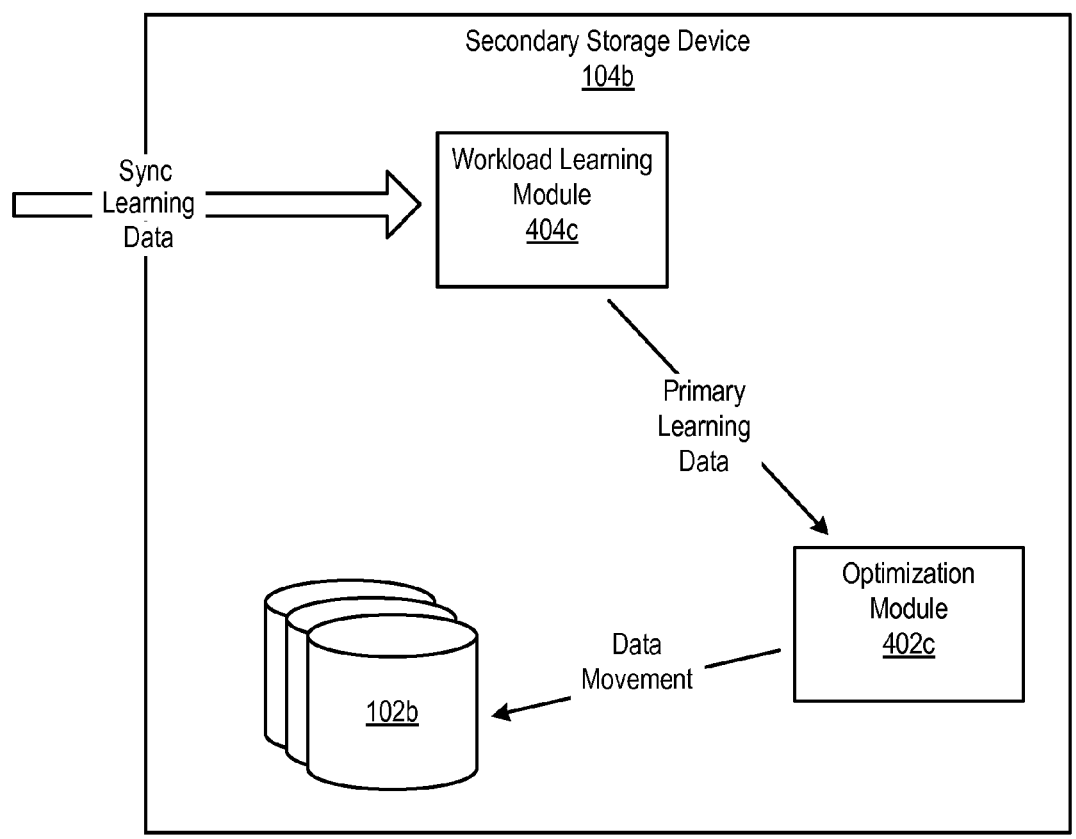
FIG. 7 is a high-level block diagram showing one embodiment of a method for configuring the secondary storage device with learning data primarily or exclusively from the primary storage device.
Figure 8:
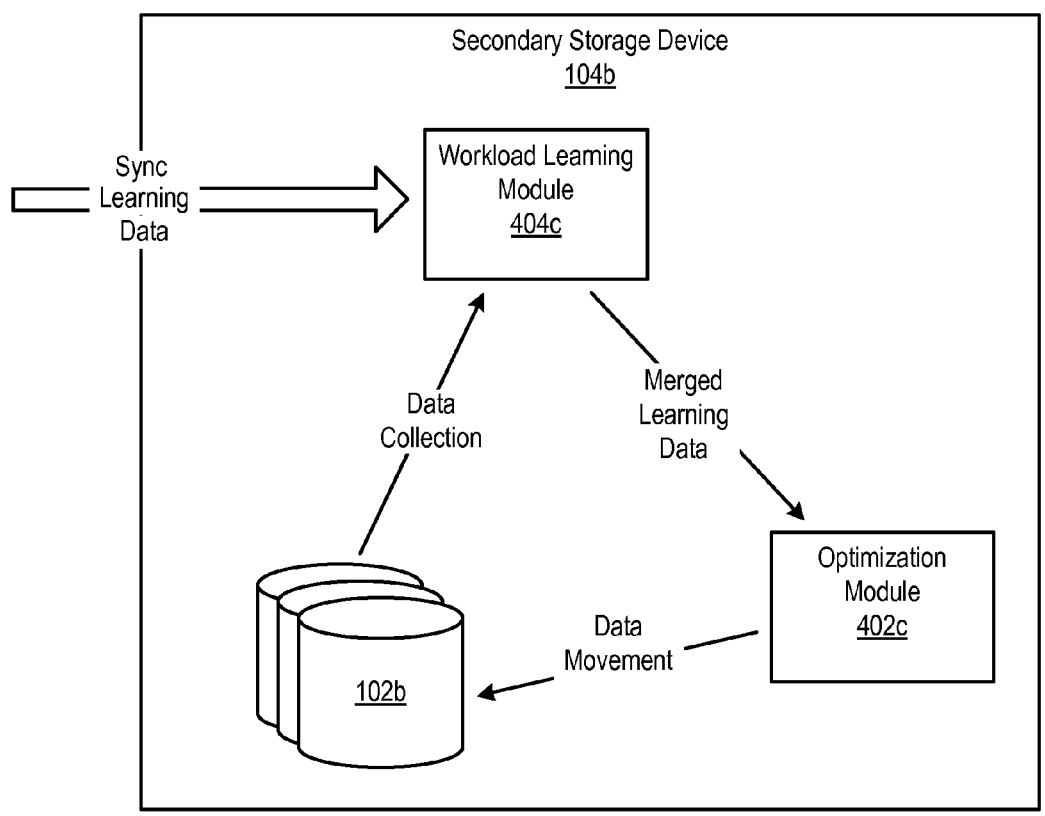
FIG. 8 is a high-level block diagram showing one embodiment of a method for configuring the secondary storage device by merging learning data from the primary storage device with learning data from the secondary storage device.

Referring to FIGS. 7 and 8, the learning data 406 received from the primary storage device 104a may be utilized at the secondary storage device 104b in various ways. For example, as shown in FIG. 7, in certain embodiments, a workload learning module 404c at the secondary storage device 104b may receive the learning data 406 and use this learning data 406 primarily or exclusively to optimize the secondary storage device 104b. As shown, the primary learning data 406 is passed to an optimization module 402c which may allocate data on the secondary volumes 102b exclusively or primarily in accordance with the primary learning data 406.

In another embodiment, as shown in FIG. 8, the workload learning module 404c at the secondary storage device 104b may receive the learning data 406 from the primary storage device 104a and merge this learning data 402 with learning data of the secondary storage device 104b. The workload learning module 404c may then use this merged learning data to optimize the secondary storage device 104b. As shown, the workload learning module 404c merges the primary learning data 406 with secondary learning data and passes the merged learning data to an optimization module 402c, which allocates data in accordance with the merged learning data. This will enable the secondary storage device 104b to exhibit I/O performance that is optimized at least partly for the I/O workload of the primary storage device 104a, and at least partly for the I/O workload of the secondary storage device 104b. This will ideally enable the secondary storage device 104b to handle one or both of the I/O workload of the primary storage device 104a and the I/O workload of the secondary storage device 104b in an optimal manner.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for replicating I/O performance in data replication environments, the method comprising:
   monitoring reads and writes to a primary storage device over a period of time, wherein writes to the primary storage device are replicated to a secondary storage device to provide data redundancy;
   generating first learning data at the primary storage device describing the reads and writes to the primary storage device;
   replicating the first learning data from the primary storage device to the secondary storage device; and
   using the first learning data to optimize the secondary storage device to handle the reads and writes in the event the reads and writes are redirected from the primary storage device to the secondary storage device.

2. The method of claim 1, wherein using the first learning data to optimize the secondary storage device comprises using the first learning data to duplicate the read and write performance of the primary storage device on the secondary storage device.

3. The method of claim 1, wherein optimizing the secondary storage device comprises configuring the secondary storage device in the same way as the primary storage device.

4. The method of claim 1, wherein optimizing the secondary storage device comprises allocating data on storage tiers of the secondary storage device in the same way as the primary storage device.

5. The method of claim 1, wherein the first learning data further includes commands to configure the secondary storage device in the same way as the primary storage device.

6. The method of claim 1, further comprising generating second learning data at the secondary storage device, the second learning data describing reads and writes to the secondary storage device.

7. The method of claim 6, wherein using the first learning data to optimize the secondary storage device further comprises merging the first learning data with the second learning data to generate merged learning data.

8. The method of claim 7, further comprising optimizing the secondary storage device in accordance with the merged learning data.

* * * * *